US008942885B2

(12) United States Patent
Yun et al.

(10) Patent No.: US 8,942,885 B2
(45) Date of Patent: Jan. 27, 2015

(54) VEHICLE INFORMATION TRANSMISSION APPARATUS

(75) Inventors: Hyun-Jeong Yun, Daejeon (KR); So-Yeon Lee, Daejeon (KR); Sang-Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 13/562,482

(22) Filed: Jul. 31, 2012

(65) Prior Publication Data

US 2013/0166138 A1 Jun. 27, 2013

(30) Foreign Application Priority Data

Dec. 23, 2011 (KR) ........................ 10-2011-0141252

(51) Int. Cl.
*G01M 17/00* (2006.01)
*G06F 7/00* (2006.01)
*G06F 19/00* (2011.01)

(52) U.S. Cl.
USPC ............ 701/32.6; 701/1; 701/33.2; 701/33.6; 701/33.7

(58) Field of Classification Search
USPC ........ 701/1, 32.6, 32.7, 31.5, 29.6, 29.3, 31.7
See application file for complete search history.

(56) References Cited

U.S. PATENT DOCUMENTS 4,404,639 A * 9/1983 McGuire et al. ............. 701/29.3
5,111,402 A * 5/1992 Brooks et al. ................ 701/29.2
5,442,553 A * 8/1995 Parrillo ......................... 455/420
5,680,328 A * 10/1997 Skorupski et al. ........... 701/29.3
5,781,101 A * 7/1998 Stephen et al. .......... 340/286.02
5,815,071 A * 9/1998 Doyle ........................... 340/439
5,931,877 A * 8/1999 Smith et al. .................. 701/31.5
6,006,147 A * 12/1999 Hall et al. .................... 701/33.2
6,141,611 A * 10/2000 Mackey et al. .............. 701/32.2
6,148,400 A * 11/2000 Arnold .......................... 713/168
6,295,492 B1 * 9/2001 Lang et al. ................... 701/32.4
6,330,499 B1 * 12/2001 Chou et al. ................... 701/31.4
6,338,152 B1 * 1/2002 Fera et al. ....................... 714/48
6,362,730 B2 * 3/2002 Razavi et al. ................. 340/438
6,370,449 B1 * 4/2002 Razavi et al. ...................... 701/1
6,380,848 B1 * 4/2002 Weigl et al. .............. 340/426.11
6,415,210 B2 * 7/2002 Hozuka et al. ............... 701/31.4
6,429,773 B1 * 8/2002 Schuyler .................... 340/425.5
6,434,455 B1 * 8/2002 Snow et al. .................. 701/31.4
6,442,459 B1 * 8/2002 Sinex ........................... 701/33.9
6,487,479 B1 * 11/2002 Nelson ......................... 701/29.1
6,556,905 B1 * 4/2003 Mittelsteadt et al. ........ 701/32.4

(Continued)

FOREIGN PATENT DOCUMENTS

JP 2004-175251 A 6/2004
JP 2007-122360 A 5/2007

(Continued)

*Primary Examiner* — Bhavesh V Amin
(74) *Attorney, Agent, or Firm* — Rabin & Berdo, P.C.

(57) ABSTRACT

Disclosed herein is a vehicle information transmission apparatus. The vehicle information transmission apparatus includes a storage unit for storing pieces of collected vehicle information, transmission grades of the pieces of vehicle information, and grades of user terminals. A control unit performs control such that relevant collected vehicle information is transmitted to a user terminal having a grade corresponding to a transmission grade of the collected vehicle information. A transmission unit transmits the vehicle information to the user terminal in compliance with a control command output from the control unit.

9 Claims, 8 Drawing Sheets

(56) References Cited

U.S. PATENT DOCUMENTS

| | | | | |
|---|---|---|---|---|
| 6,574,734 | B1 * | 6/2003 | Colson et al. | 726/21 |
| 6,611,740 | B2 * | 8/2003 | Lowrey et al. | 701/29.4 |
| 6,651,001 | B2 * | 11/2003 | Apsell | 701/29.3 |
| 6,662,091 | B2 * | 12/2003 | Wilson et al. | 701/29.3 |
| 6,675,081 | B2 * | 1/2004 | Shuman et al. | 701/48 |
| 6,732,031 | B1 * | 5/2004 | Lowrey et al. | 701/31.4 |
| 6,810,312 | B2 * | 10/2004 | Jammu et al. | 701/29.4 |
| 6,941,202 | B2 * | 9/2005 | Wilson et al. | 701/31.5 |
| 7,050,892 | B1 * | 5/2006 | Liebl et al. | 701/32.6 |
| 7,113,127 | B1 * | 9/2006 | Banet et al. | 342/357.31 |
| 7,155,321 | B2 * | 12/2006 | Bromley et al. | 701/29.6 |
| 7,263,417 | B2 * | 8/2007 | Gutierrez et al. | 701/29.6 |
| 7,359,772 | B2 * | 4/2008 | Paturi et al. | 701/29.6 |
| 7,480,551 | B1 * | 1/2009 | Lowrey et al. | 701/29.3 |
| 7,487,018 | B2 * | 2/2009 | Afshar et al. | 701/29.6 |
| RE40,799 | E * | 6/2009 | Chen | 701/33.2 |
| 7,606,643 | B2 * | 10/2009 | Hunt et al. | 701/36 |
| 7,904,219 | B1 * | 3/2011 | Lowrey et al. | 701/32.3 |
| 8,589,018 | B2 * | 11/2013 | Sarnacke et al. | 701/29.2 |
| 2001/0033225 | A1 * | 10/2001 | Razavi et al. | 340/425.5 |
| 2002/0016655 | A1 * | 2/2002 | Joao | 701/35 |
| 2002/0065698 | A1 * | 5/2002 | Schick et al. | 705/8 |
| 2003/0130005 | A1 * | 7/2003 | Weisshaar et al. | 455/525 |
| 2003/0147534 | A1 * | 8/2003 | Ablay et al. | 380/270 |
| 2006/0122746 | A1 * | 6/2006 | Gawlik et al. | 701/29 |
| 2007/0006322 | A1 * | 1/2007 | Karimzadeh et al. | 726/27 |
| 2008/0184330 | A1 * | 7/2008 | Lal et al. | 726/1 |
| 2009/0300365 | A1 * | 12/2009 | Karmes et al. | 713/182 |
| 2013/0166138 | A1 * | 6/2013 | Yun et al. | 701/32.6 |

FOREIGN PATENT DOCUMENTS

| | | | |
|---|---|---|---|
| KR | 2003-0000807 | A | 1/2003 |
| KR | 2008-0038596 | A | 5/2008 |
| KR | 2010-0122332 | A | 11/2010 |

* cited by examiner

VEHICLE INFORMATION TRANSMISSION APPARATUS

CROSS REFERENCE TO RELATED APPLICATION

This application claims the benefit of Korean Patent Application No. 10-2011-0141252, filed on Dec. 23, 2011, which is hereby incorporated by reference in its entirety into this application.

BACKGROUND OF THE INVENTION

1. Technical Field

The present invention relates generally to a vehicle information transmission apparatus and, more particularly, to a vehicle information transmission apparatus, which can specify rights to access respective pieces of vehicle information, cope with a communication failure, and control transmission periods for respective pieces of vehicle information, in a vehicle information transmission apparatus which is intended to provide a diagnostic service, such as determination of whether an abnormality has occurred in driving devices such as an engine or a brake, and a service for vehicle monitoring and theft tracking, via an external device of a vehicle.

2. Description of the Related Art

Recently, a Mobile In Vehicle (MIV) service for providing a mobile interworking entertainment service has attracted attention. Such an MIV service provides an abnormality notification service for driving devices, a vehicle monitoring service, a theft tracking service, etc. using terminals. In addition to the MIV service, attempts have been made to provide a door unlock-lock control service, a trunk compartment open-close control service, and diagnostic services for engine-gear shift-coolant for example, using terminal-based remote vehicle diagnostic/control services.

For this, a vehicle information transmission apparatus mounted in a vehicle collects vehicle information from a vehicle network and transmits collected vehicle information to a terminal, and the terminal displays the received vehicle information. Here, the vehicle information is data indicating the states of the vehicle, and includes driving environment-related information such as a vehicle speed, the amount of remaining fuel, and a vehicle location, vehicle monitoring-related information, convenience-related information such as the internal temperature, seats, and mirror adjustment of the vehicle, entertainment-related information, etc. Recently, actions have been actively taken to provide various application services using vehicle information.

Vehicle information needs to be set such that only persons having the right of access to relevant vehicle information can access the vehicle information and persons having no right of access are prohibited from accessing the vehicle information. However, a conventional vehicle information transmission apparatus has a problem related to the security of vehicle information because all persons can access the vehicle information.

Further, the conventional vehicle information transmission apparatus is disadvantageous in that there is no method of suitably coping with situations in which vehicle information cannot be transmitted to a relevant user terminal because of terminal defects or communication interference, so that the case where the user misses out on important information may occur.

Furthermore, there is a need to set different periods at which respective pieces of vehicle information collected by the vehicle information transmission apparatus mounted in the vehicle are to be transmitted to the user terminal. However, the conventional vehicle information transmission apparatus is problematic in that it transmits pieces of vehicle information either at a time or only upon receiving the request of a user, so that the vehicle information cannot be opportunely transmitted to the user terminal.

SUMMARY OF THE INVENTION

Accordingly, the present invention has been made keeping in mind the above problems occurring in the prior art, and an object of the present invention is to provide a vehicle information transmission apparatus, which can specify rights to access respective pieces of vehicle information, cope with a communication failure, and control transmission periods for respective pieces of vehicle information, in a vehicle information transmission apparatus which is intended to provide a diagnostic service, such as determination of whether an abnormality has occurred in driving devices such as an engine or a brake, and a service for vehicle monitoring and theft tracking, via an external device of a vehicle.

In accordance with a first aspect of the present invention to accomplish the above object, there is provided a vehicle information transmission apparatus including a storage unit for storing pieces of collected vehicle information, transmission grades of the pieces of vehicle information, and grades of user terminals; a control unit for performing control such that each piece of collected vehicle information is transmitted to a user terminal having a grade corresponding to a transmission grade of the collected vehicle information; and a transmission unit for transmitting the vehicle information to the user terminal in compliance with a control command output from the control unit.

Preferably, the control unit may perform control such that if communication with the user terminal having the grade corresponding to the transmission grade of the vehicle information has failed, the vehicle information is transmitted to a user terminal having a lower priority grade.

Preferably, the control unit may perform control such that specific part of the collected vehicle information is transmitted to all user terminals.

Preferably, the control unit may perform control such that a notification of a failure in communication with the user terminal having the grade corresponding to the transmission grade of the vehicle information is provided to the user terminal having the lower priority grade.

Preferably, the control unit may be configured to, when a vehicle information request is received from the user terminal, determine whether a grade of requested vehicle information corresponds to the transmission grade of the user terminal, and transmit the vehicle information to the user terminal if the grade of the requested vehicle information corresponds to the transmission grade.

Preferably, the control unit may be configured to, when the user terminal sets vehicle information which is to be periodically received and periods thereof, periodically transmit the set vehicle information to the user terminal at the set periods.

Preferably, the control unit may be configured to, when the user terminal sets event occurrence conditions, receive the vehicle information, determine whether the received vehicle information meets the event occurrence conditions, and send an event occurrence message indicating that an event has occurred to the user terminal if the received vehicle information meets the event occurrence conditions.

In accordance with a second aspect of the present invention to accomplish the above object, there is provided a vehicle information transmission apparatus including a storage unit for storing pieces of collected vehicle information, transmission grades of the pieces of vehicle information, and grades of user terminals; a control unit for performing control such that if communication with a user terminal having a grade corresponding to a transmission grade of each piece of collected vehicle information has failed, the vehicle information is transmitted to a user terminal having a lower priority grade; and a transmission unit for transmitting the vehicle information to the user terminal in compliance with a control command output from the control unit.

In accordance with a third aspect of the present invention to accomplish the above object, there is provided a vehicle information transmission apparatus including a storage unit for storing pieces of collected vehicle information, transmission modes of the pieces of vehicle information, and passwords for the respective transmission modes; a control unit for extracting a transmission mode corresponding to a password input from a user terminal, and performing control such that each piece of vehicle information is transmitted to a user terminal having the extracted transmission mode; and a transmission unit for transmitting the vehicle information to the user terminal in compliance with a control command output from the control unit.

Preferably, the transmission modes may include any one of driver mode, passenger mode, and diagnostic tool mode.

Preferably, in respective transmission modes, different algorithms may be set to be used.

In accordance with a fourth aspect of the present invention to accomplish the above object, there is provided a vehicle information transmission apparatus including a storage unit for storing pieces of collected vehicle information, transmission modes of the pieces of collected vehicle information, and modes of user terminals; a control unit for performing control such that each piece of collected vehicle information is transmitted to a user terminal having a mode corresponding to a transmission mode of the collected vehicle information; and a transmission unit for transmitting the vehicle information to the user terminal in compliance with a control command output from the control unit.

Preferably, the transmission modes may include any one of driver mode, passenger mode, and diagnostic tool mode, and the transmission modes may have priorities.

Preferably, a user terminal that receives vehicle information in the driver mode may receive vehicle information transmitted in the passenger mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
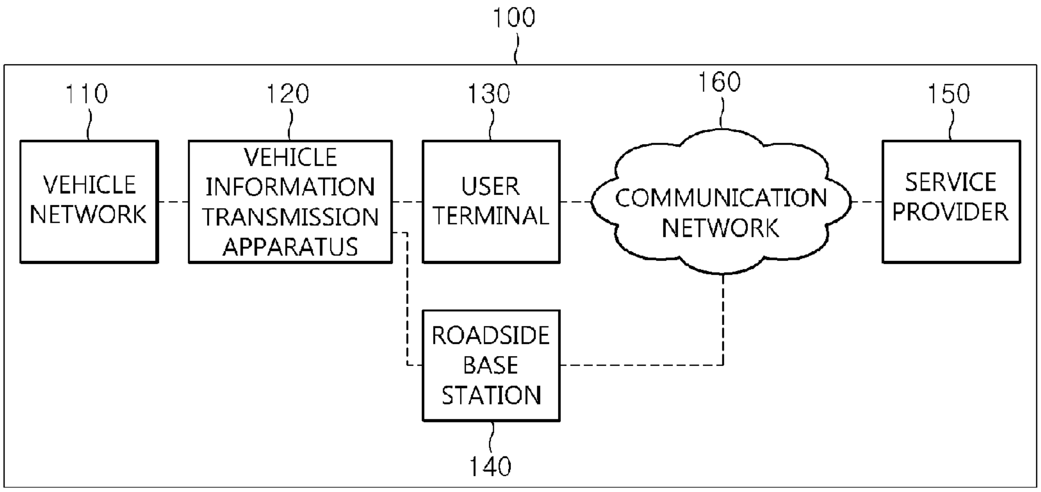
FIG. 1 is a diagram showing a vehicle information transmission system according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

In the overall specification, a representation indicting that a certain part includes a certain component means that more components may be further included in the certain part without excluding other components unless a description to the contrary is specifically given.

Figure 2:
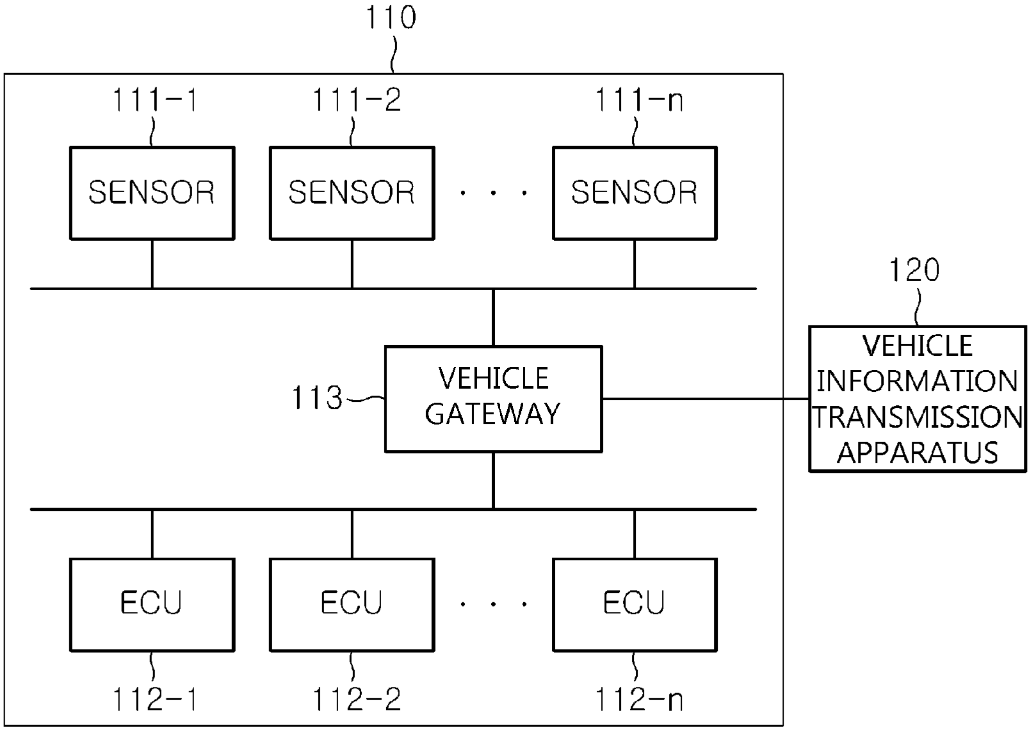
FIG. 2 is a diagram showing a vehicle network according to an embodiment of the present invention.
Figure 3:
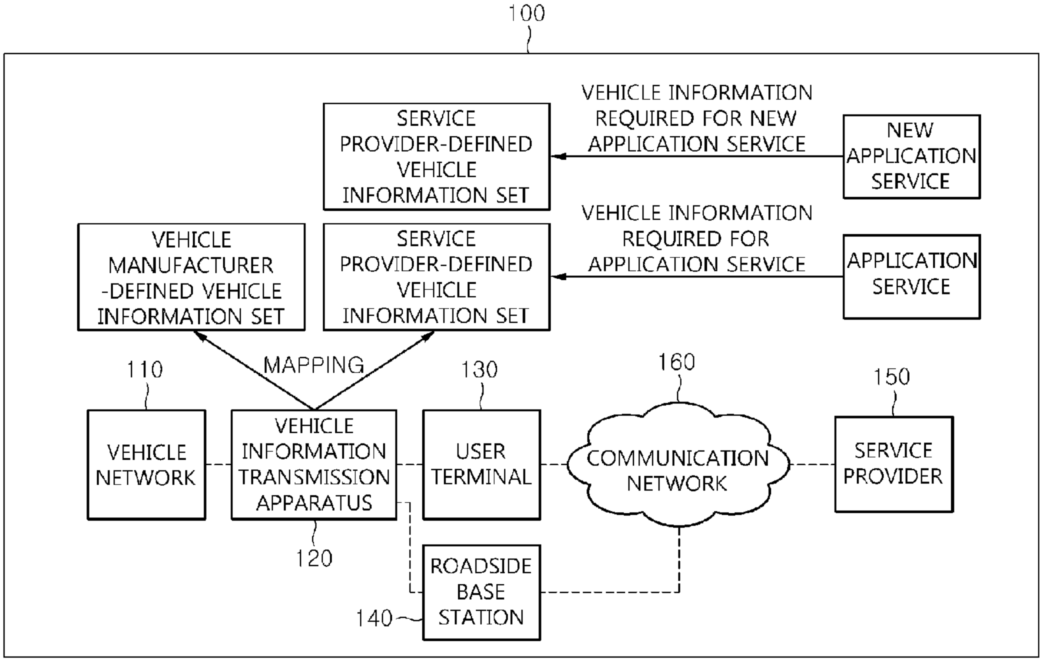
FIG. 3 is a diagram showing an example of mapping between vehicle information sets based on application services in a vehicle information transmission system according to an embodiment of the present invention.

FIG. 1 is a diagram showing a vehicle information transmission system 100 according to an embodiment of the present invention, FIG. 2 is a diagram showing a vehicle network 110 according to an embodiment of the present invention, and FIG. 3 is a diagram showing an example of mapping between vehicle information sets based on application services in the vehicle information transmission system 100 according to an embodiment of the present invention.

Referring to FIG. 1, the vehicle information transmission system 100 includes a vehicle network 110, a vehicle information transmission apparatus 120, a user terminal 130, a roadside base station 140, and a service provider 150.

Referring to FIGS. 1 and 2, the vehicle network 110 is formed in a vehicle and includes one or more sensors 111-1, 111-2, . . . , 111-*n*, one or more Electronic Control Units (ECUs) 112-1, 112-2, . . . , 112-*n*, and a vehicle gateway 113.

The vehicle gateway 113 is connected to the sensors 111-1, 111-2, . . . , 111-*n* and the ECUs 112-1, 112-2, . . . , 112-*n*, and is configured to transmit pieces of vehicle information collected from the sensors 111-1, 111-2, . . . , 111-*n* and the ECUs 112-1, 112-2, . . . , 112-*n* to the vehicle information transmission apparatus 120.

Referring back to FIG. 1, the vehicle information transmission apparatus 120 may be connected to the inside of the vehicle, that is, the vehicle network 110, using Controller Area Network (CAN), Media Oriented Systems Transport (MOST), FlexRay communication, or the like, and may be connected to external devices, such as the user terminal 130 and the roadside base station 140, using Bluetooth, Wireless Fidelity (WiFi), Ethernet/Internet Protocol (IP) communication, or the like, thus communicating with the external devices. For example, the vehicle information transmission apparatus 120 is connected to the vehicle network 110 via an On-Board Diagnostics (OBD) interface or a CAN interface, and is capable of transmitting the pieces of vehicle information collected from the vehicle network 110 to the user terminal 130 and/or the roadside base station 140. The vehicle information transmission apparatus 120 may have an IP address when performing Ethernet-based communication.

The user terminal 130 is located inside or outside the vehicle and is configured to receive the vehicle information via short-range communication with the vehicle information transmission apparatus 120.

The roadside base station 140 is located outside the vehicle and is configured to receive the vehicle information via medium long-range communication with the vehicle information transmission apparatus 120.

The service provider 150 communicates with the user terminal 130 and/or the roadside base station 140 via a communication network 160, and provides an application service based on vehicle information obtained as a result of the communication. The service provider 150 may be, for example, an Intelligent Transportation System (ITS) service provider or a vehicle diagnostic service provider.

Meanwhile, referring to FIG. 3, vehicle information sets including data about vehicle information are defined for respective vehicle manufacturers or for respective service providers. Vehicle information sets defined by vehicle manufacturers (hereinafter referred to as "vehicle manufacturer-defined vehicle information sets") are transmitted from the vehicle network 110 and stored in the vehicle information transmission apparatus 120. Vehicle information sets defined by the service provider 150 (hereinafter referred to as "service provider-defined vehicle information sets") include vehicle information required by the service provider 150 to provide an application service.

A vehicle manufacturer-defined vehicle information set and a service provider-defined vehicle information set are different from each other in terms of data type, representation scheme, etc. For example, even in the case of pieces of vehicle information indicating an engine speed, the data type and the representation scheme of the vehicle manufacturer-defined vehicle information set may be different from those of the service provider-defined vehicle information set.

Therefore, the vehicle information transmission apparatus 120 maps relationships between the vehicle manufacturer-defined vehicle information set and the service provider-defined vehicle information set, and transmits the vehicle information to the user terminal 130 and/or the roadside base station 140 based on the results of the mapping. However, if the service provider 150 desires to add a new application service or delete an existing application service, the service provider-defined vehicle information set is changed. Therefore, even when the vehicle manufacturer-defined vehicle information set supports a new service provider-defined vehicle information set, there is a need to change a protocol between the vehicle information transmission apparatus 120 and the user terminal 130 or between the vehicle information transmission apparatus 120 and the roadside base station 140.

For example, protocols such as the ISO/NP 29284 ITS event based probe vehicle data, ISO 22837 vehicle probe data for wide area communications, and SAE J 2735 DSRC Msg. Set Dic, are used between the service provider 150, which provides an emergency security service and a vehicle probe data collection service 150, and the user terminal 130 or the roadside base station 140.

If the service provider 150 desires to further provide a vehicle diagnostic service, which is a new application service, in addition to the emergency security service and the vehicle probe data collection service, new protocols are used between the user terminal 130 and the service provider 150 and between the roadside base station 140 and the service provider 150. Individual protocols define different data formats, representation schemes, message identifications (IDs), etc., and data formats are not cross-referenced between the protocols.

In this way, whenever the service provider 150 desires to provide a new application service, protocols required to transmit vehicle information between the vehicle information transmission apparatus 120 and the user terminal 130 or the roadside base station 140 are changed. The vehicle information transmission apparatus 120 and the user terminal 130 must change software programs to support the protocols which have been changed. Hereinafter, a method in which the vehicle information transmission apparatus transmits vehicle information to the terminal or the roadside base station irrespective of the change in the application service provided by the service provider 150 will be described.

Figure 4:
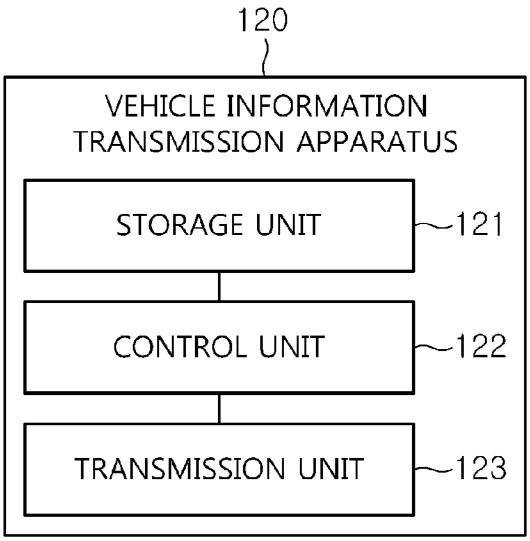
FIG. 4 is a diagram schematically showing the configuration of a vehicle information transmission apparatus according to an embodiment of the present invention.

FIG. 4 is a diagram schematically showing the configuration of the vehicle information transmission apparatus 120 according to an embodiment of the present invention.

Referring to FIG. 4, the vehicle information transmission apparatus 120 according to the embodiment of the present invention may include a storage unit 121, a control unit 122, and a transmission unit 123. The configuration of the vehicle information transmission apparatus 120 conforms to one embodiment, wherein all blocks shown in FIG. 4 are not essential components and some blocks may be added, changed or deleted in other embodiments.

The storage unit 121 stores pieces of collected vehicle information, the transmission grades of the pieces of vehicle information, and the grades of user terminals. The transmission grade of vehicle information may include the transmission mode of the vehicle information. The grade of each user terminal may include the mode of the user terminal. In an embodiment, transmission mode may include driver mode, passenger mode, and diagnostic tool mode. The vehicle information transmission apparatus 120 may set algorithms that are used in respective transmission modes as different algorithms.

Further, transmission grades or transmission modes may have priorities. For example, transmission modes may have priorities in the sequence of driver mode, passenger mode, and diagnostic tool mode. Furthermore, in transmission modes, passwords can be set for respective transmission modes. In this case, the storage unit 121 may store passwords for respective transmission modes.

The control unit 122 may perform control such that each piece of collected vehicle information is transmitted to a user terminal having a grade corresponding to the transmission grade of the vehicle information. In an embodiment, when the transmission grade of the vehicle information includes the transmission mode of the vehicle information, and the grade of a user terminal includes the mode of the user terminal, the control unit 122 may perform control such that the vehicle information is transmitted to a user terminal having a mode corresponding to the transmission mode of the collected vehicle information.

Furthermore, when passwords are set for respective transmission modes, the control unit 122 may perform control such that a transmission mode corresponding to a password input from the user terminal is extracted and the vehicle information is transmitted to the user terminal having the extracted transmission mode.

In an embodiment, when transmission grades or transmission modes have priorities, the control unit 122 may perform control such that if communication with a user terminal having a grade corresponding to the transmission grade of the vehicle information has failed, the vehicle information is transmitted to a user terminal having a lower priority grade. Further, the control unit 122 may perform control such that a notification of a failure in communication with the user terminal having the grade corresponding to the transmission grade of the vehicle information is provided to the user terminal having the lower priority grade.

In accordance with a method of coping with such a communication failure, when information to which, for example, only a driver, has the right of access is provided, a notification of the failure in communication with a driver terminal can be provided to the passenger, and measures can be taken. Alternatively, when both the driver and the passenger have the right of access to information, the notification of the failure in communication with the driver terminal can be provided to the passenger while the information is provided to the passenger.

Meanwhile, the control unit 122 may perform control such that specific part of the collected vehicle information is transmitted to all of the user terminals.

The transmission unit 123 transmits the vehicle information to the user terminal in compliance with a control command output from the control unit 122. Further, the transmission unit 123 may transmit vehicle information so that, in compliance with the control command output from the control unit 122, the user terminal which receives vehicle information in driver mode also receives vehicle information that has been transmitted in passenger mode.

Further, the transmission unit 123 may include a communication unit (not shown) for transmitting a message requesting vehicle information to the vehicle network 110 or for receiving a response message including the vehicle information from the vehicle network 110 in response to a vehicle information request. Alternatively, the transmission unit 123 may include a communication unit (not shown) for receiving a message requesting vehicle information from the user terminal 130, or for transmitting a response message including vehicle information to the user terminal 130.

Figure 5:
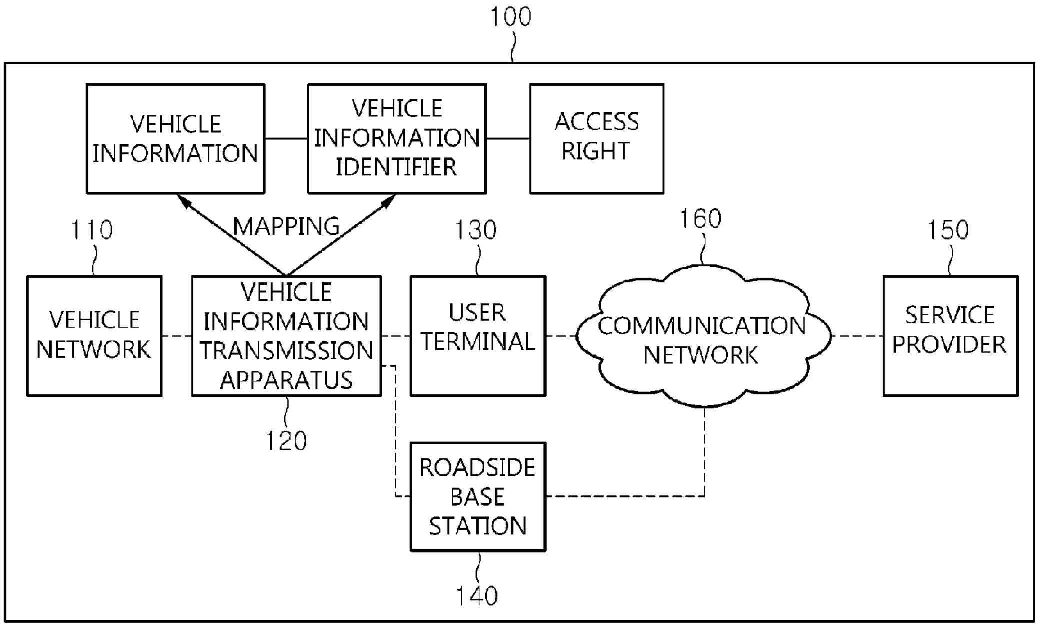
FIGS. 5 and 6 are diagrams showing a vehicle information transmission method performed by the vehicle information transmission system according to an embodiment of the present invention.
Figure 6:
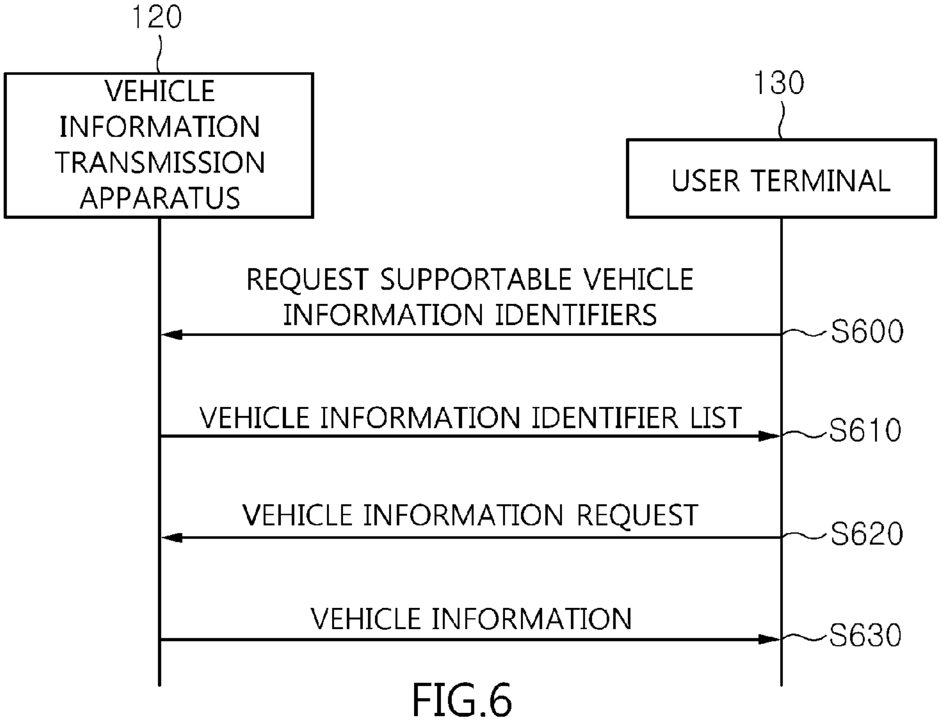

FIGS. 5 and 6 are diagrams showing a vehicle information transmission method performed by the vehicle information transmission system 100 according to an embodiment of the present invention.

Referring to FIG. 5, the vehicle information transmission system 100 includes a vehicle network 110, a vehicle information transmission apparatus 120, a user terminal 130, a roadside base station 140, and a service provider 150. The vehicle information transmission apparatus 120 is connected to the vehicle network 110 and is configured to transfer pieces of vehicle information collected from the vehicle network 110 to the user terminal 130. Below, a method in which the vehicle information transmission apparatus 120 transmits vehicle information to the user terminal 130 has been illustrated, but the vehicle information transmission apparatus 120 may also transmit the vehicle information to the roadside base station 140 or directly transmit the vehicle information to the service provider 150.

The vehicle information transmission apparatus 120 stores a list of vehicle information identifiers. The vehicle information identifier list contains pieces of vehicle information currently supportable by a vehicle and vehicle information identifiers mapped to the respective pieces of vehicle information. The vehicle information identifier list may further contain information about the rights to access respective pieces of vehicle information. The service provider 150 communicates with the user terminal 130 and/or the roadside base station 140 over the communication network 160, and provides an application service based on vehicle information obtained as a result of the communication.

Table 1 shows an example of a vehicle information identifier list stored by the vehicle information transmission apparatus 120.

TABLE 1

| Vehicle information identifier | Data element | Operation | Value | Access right |
|---|---|---|---|---|
| ECU-1/Data identifier-1 | Driver door | Lock/Unlock/ Monitor | Lock/unlock | Driver/ Passenger/ Diagnostic Tool |
| ECU-1/Data identifier-2 | Seatbelt | | Engaged/not engaged | Driver/ Passenger |
| ECU-1/Data identifier-3 | Window lock | Lock/Unlock/ Monitor | | Driver/ Passenger/ Diagnostic Tool |
| ECU-2/Data identifier-1 | Fuel | Monitor | Level (Liter) | Driver |
| ECU-3/Data identifier-2 | Engine oil | Monitor | Level (Liter) | Driver/ Diagnostic Tool |

Table 1 includes a list of vehicle information identifiers mapped to respective pieces of vehicle information. The vehicle information identifiers may include identification information about vehicle devices from which the vehicle information has been collected, and identification information about data which includes the vehicle information. For example, the vehicle information identifiers may include combinations of ECU identifiers ECU-1, ECU-2, and ECU-3 and data identifiers Data Identifier-1, Data Identifier-2, and Data Identifier-3.

Further, access right modes, that is, transmission modes, may be defined for respective vehicle information identifiers. Access right modes may include driver mode, passenger mode, and diagnostic tool mode. Access rights may be defined for respective vehicle information identifiers based on the characteristics of vehicle information. For example, the right of access to vehicle information having privacy characteristics may be permitted only to the driver, and the right of access to vehicle information for vehicle maintenance and entertainment information may be permitted both to the driver and to the passenger. Further, the right of access to vehicle diagnostic information may be permitted to the service provider 150, and the right of access to emergency/security information may be permitted to the driver, the passenger and the service provider 150. Alternatively, the transmission of specific part of the vehicle information to all user terminals may be allowed.

Further, for respective transmission modes, passwords can be set. In this case, when a password for desired transmission mode is input via the user terminal 130 so as to receive vehicle information in the state in which different passwords have been set for respective transmission modes, the vehicle information transmission apparatus 120 checks the password, and transmits vehicle information to the user terminal 130 only if the password is identical to a preset password.

Referring to FIGS. 5 and 6, the user terminal 130 requests a currently supportable vehicle information identifier list from the vehicle information transmission apparatus 120 at step S600. The vehicle information transmission apparatus

120 provides the currently supportable vehicle information identifier list to the user terminal 130 at step S610.

The user terminal 130 selects some vehicle information identifiers from the received vehicle information identifier list, and transmits the selected vehicle information identifiers to the vehicle information transmission apparatus 120 at step S620. The vehicle information transmission apparatus 120 transmits vehicle information corresponding to the received vehicle information identifiers to the user terminal 130 at step S630.

For example, if the vehicle information transmission apparatus 120 transmits a list of vehicle information identifiers mapped to respective pieces of vehicle information (ECU-1/Data Identifier-1_Driver Door, and ECU-3/Data Identifier-2_Engine Oil) to the user terminal 130 at step S610, the user terminal 130 selects a vehicle information identifier ECU-1/Data Identifier-1, and transmits it to the vehicle information transmission apparatus 120 at step S620. The vehicle information transmission apparatus 120 may transmit information about the locked/unlocked state of the driver's seat door, together with the vehicle information identifier ECU-1/Data Identifier-1, to the user terminal 130 at step S630.

In accordance with the method illustrated in FIGS. 5 and 6, vehicle information identifiers and pieces of vehicle information can be transmitted between the vehicle information transmission apparatus 120 and the user terminal 130 using an Extensible Markup Language (XML)-based protocol, regardless of the type of application service. With regard to this, there is no need to change a vehicle information transmission method according to a change in application service. Further, vehicle information is transmitted between the vehicle information transmission apparatus 120 and the user terminal 130 using vehicle information identifiers. Therefore, the vehicle information can be simply and efficiently transmitted regardless of the type of application service.

Figure 7:
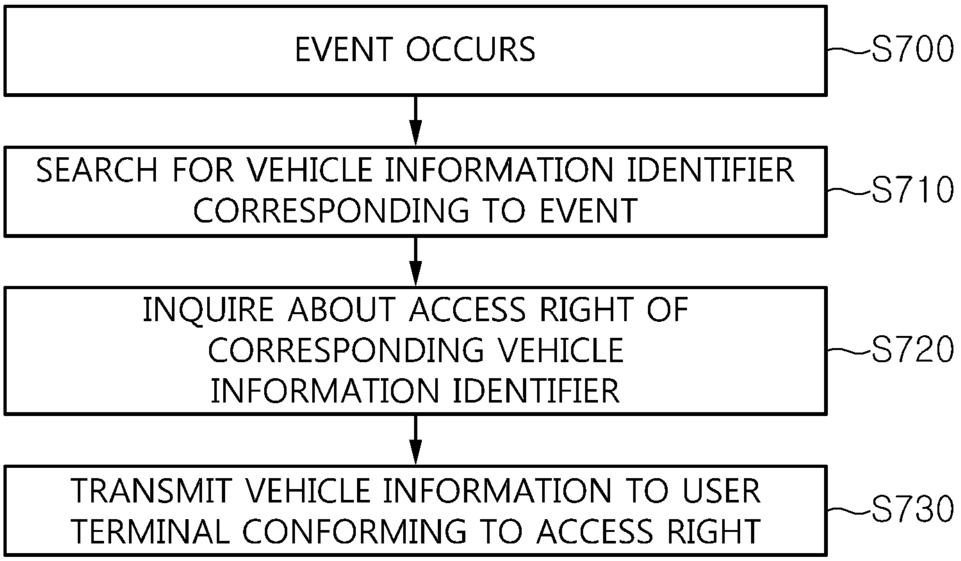
FIG. 7 is a flowchart showing an operating method of the vehicle information transmission apparatus when an event occurs in a vehicle according to an embodiment of the present invention.

FIG. 7 is a flowchart showing an operating method of the vehicle information transmission apparatus 120 when an event occurs in a vehicle according to an embodiment of the present invention.

Referring to FIG. 7, when an event occurs in the vehicle at step S700, the vehicle information transmission apparatus 120 searches the stored vehicle information identifier list for a vehicle information identifier corresponding to the event that has occurred at step S710. The event may be, for example, the opening of a vehicle door, the closing of a vehicle door, a notification of time to change the engine oil, etc.

When one or more terminals capable of receiving vehicle information are present inside or near the vehicle, the vehicle information transmission apparatus 120 inquires about the access right of the corresponding vehicle information identifier at step S720, and transmits the vehicle information to a user terminal 130 conforming to the access right at step S730. For example, in the case where a driver terminal and a passenger terminal are present inside the vehicle, if the access right of the corresponding vehicle information identifier is restricted only to the driver, the vehicle information transmission apparatus 120 may transmit the vehicle information to the user terminal 130 of the driver.

Figure 8:
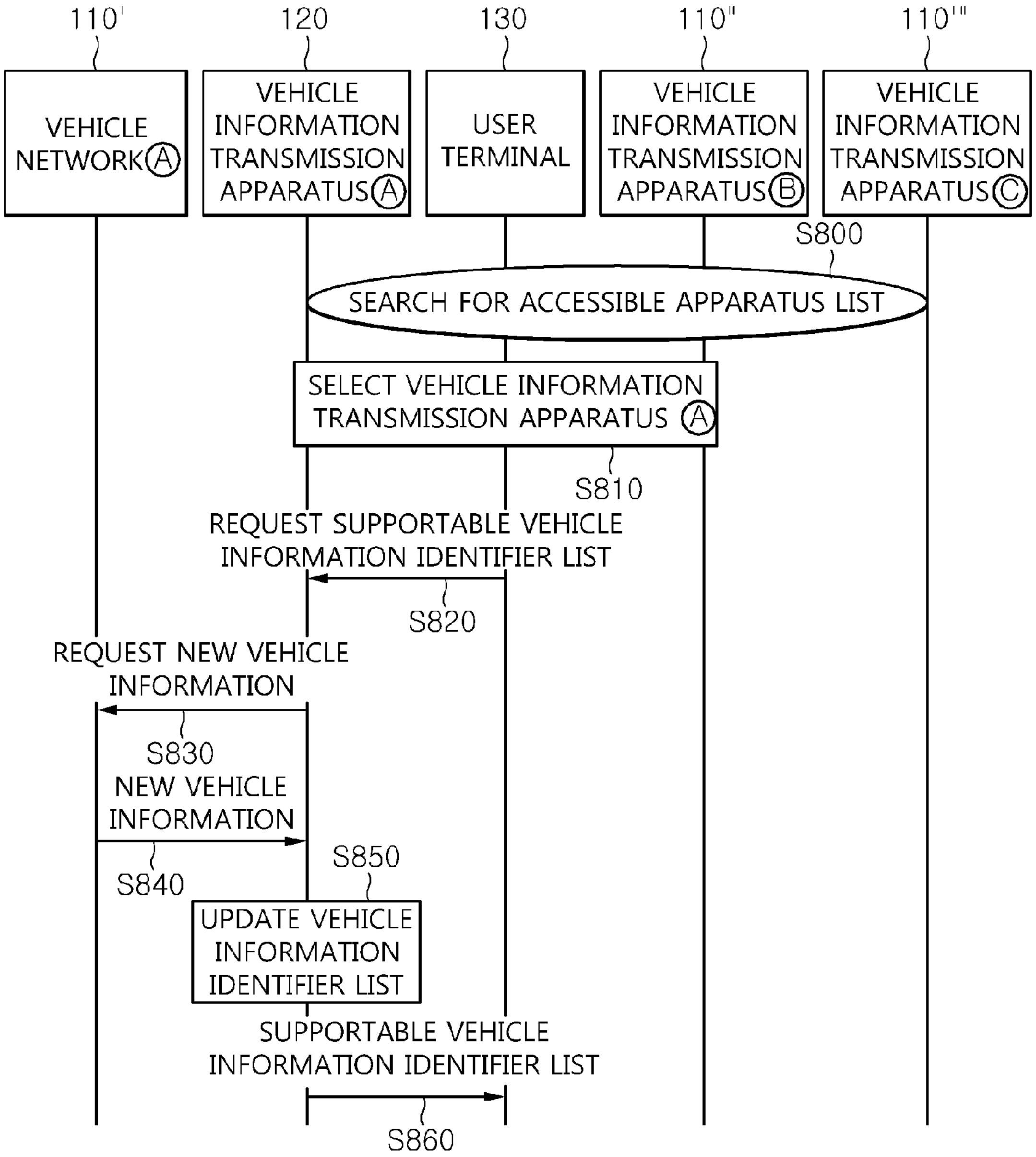
FIG. 8 is a flow diagram showing a method of transmitting a vehicle information identifier list between the vehicle information transmission apparatus and a user terminal according to an embodiment of the present invention.

FIG. 8 is a flow diagram showing a method of transmitting a vehicle information identifier list between the vehicle information transmission apparatus 120 and the user terminal 130 according to an embodiment of the present invention.

Referring to FIG. 8, the user terminal 130 searches a list of accessible vehicle information transmission apparatuses 120 at step S800. For example, when a user is located near vehicle A, vehicle B, and vehicle C, and vehicles A and C are owned by a user, vehicle information transmission apparatus A (Vehicle Mobile Gateway: VMG 1) corresponding to vehicle A and vehicle information transmission apparatus C (VMG 3) corresponding to vehicle C can be found as usable vehicle information transmission apparatuses 120. On the screen of the user terminal 130, the information given in Table 2 may be displayed.

TABLE 2

| List of accessible devices |
|---|
| VMG1 (version 1.10) |
| Vehicle type: Type A<br>Vehicle model: model A |
| VMG2 (version 1.20) |
| Vehicle type: Type C<br>Vehicle model: model C |

The list of accessible vehicle information transmission apparatuses 120 displayed on the user terminal 130 may include a vehicle type, a vehicle model, the version of each vehicle information transmission apparatus 120, etc.

When the user desires to know vehicle information about vehicle A, the user terminal 130 selects vehicle information transmission apparatus A from the found vehicle information transmission apparatus list at step S810. In this case, the user can select vehicle information transmission apparatus A via a user interface.

The user terminal 130 requests a currently supportable vehicle information identifier list from vehicle information transmission apparatus A at step S820. In this case, the user terminal 130 may request the vehicle information identifier list using an XML-based protocol.

Vehicle information transmission apparatus A requests vehicle information newly supported by vehicle A from vehicle network A at step S830, and vehicle network A transmits newly supported vehicle information to the vehicle information transmission apparatus A at step S840. The vehicle information newly supported by vehicle A may be known from information newly registered on each ECU of vehicle network A.

The vehicle information transmission apparatus A updates a vehicle information identifier list based on the vehicle information received from vehicle network A at step S850, and transmits a currently supportable vehicle information identifier list to the user terminal 130 at step S860.

Accordingly, the information given in Table 3 may be displayed on the screen of the user terminal 130.

TABLE 3

| Usable data (ECU 2) |
|---|
| ECU 2-Data Id 1: Fuel<br>ECU 2-Data Id 2: Engine oil<br>ECU 2-Data Id 3: driver side door state |

The user terminal 130 that received the vehicle information identifier list using the method illustrated in Table 3 may request vehicle information corresponding to a relevant vehicle information identifier from vehicle information transmission apparatus A. In this case, the user terminal 130 may use XYZ_CALL longMode.

Figure 9:
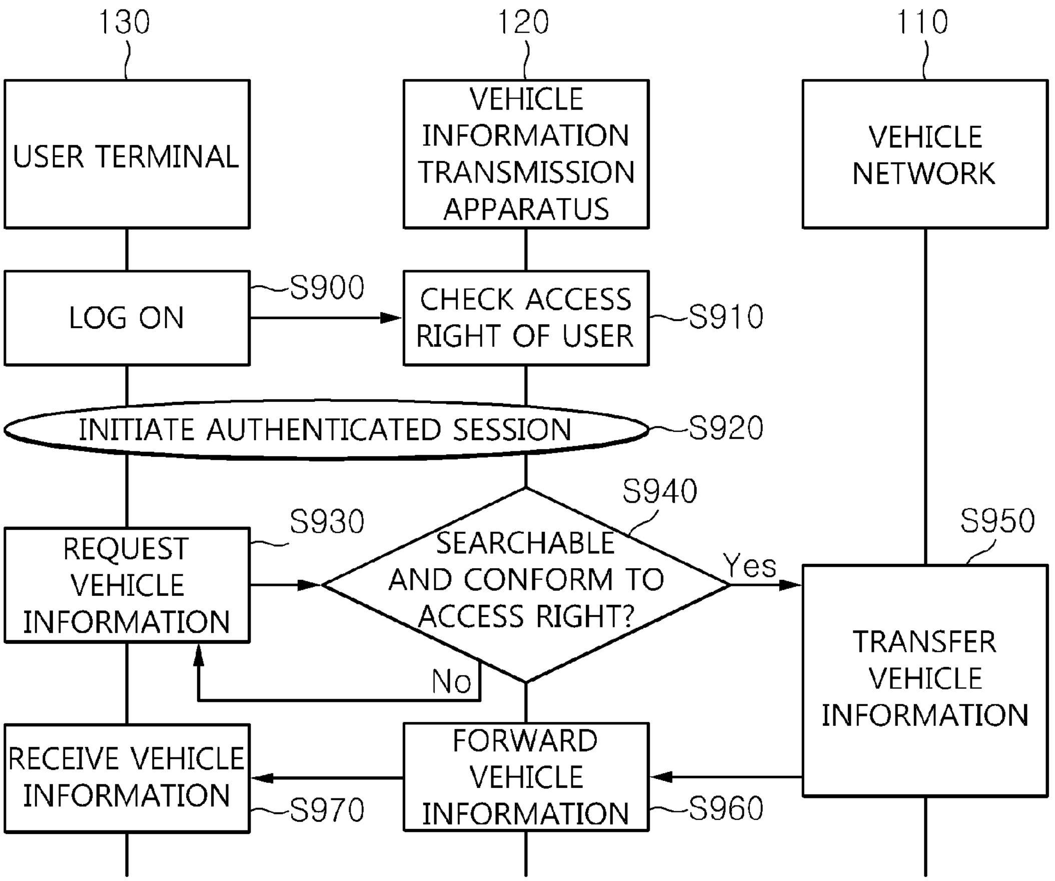
FIGS. 9 to 11 are flow diagrams showing embodiments of a vehicle information transmission period control method performed by the vehicle information transmission apparatus according to an embodiment of the present invention.
Figure 10:
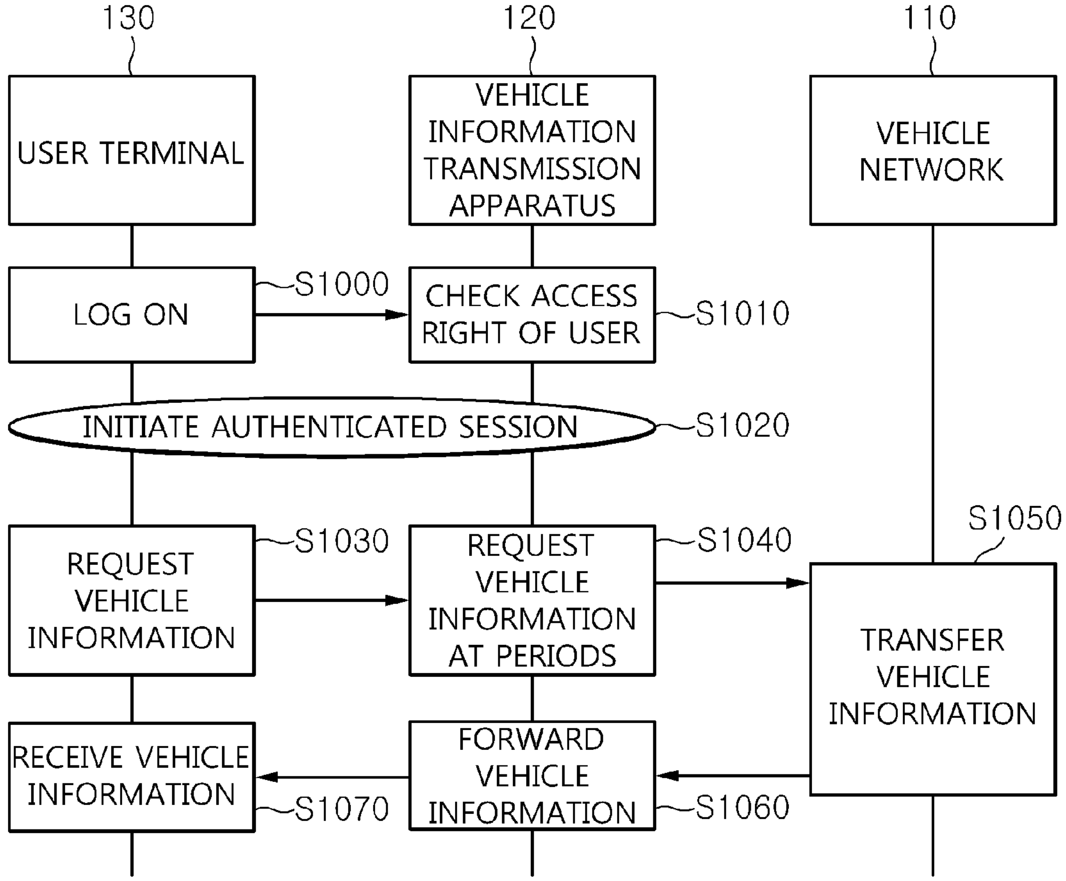
Figure 11:
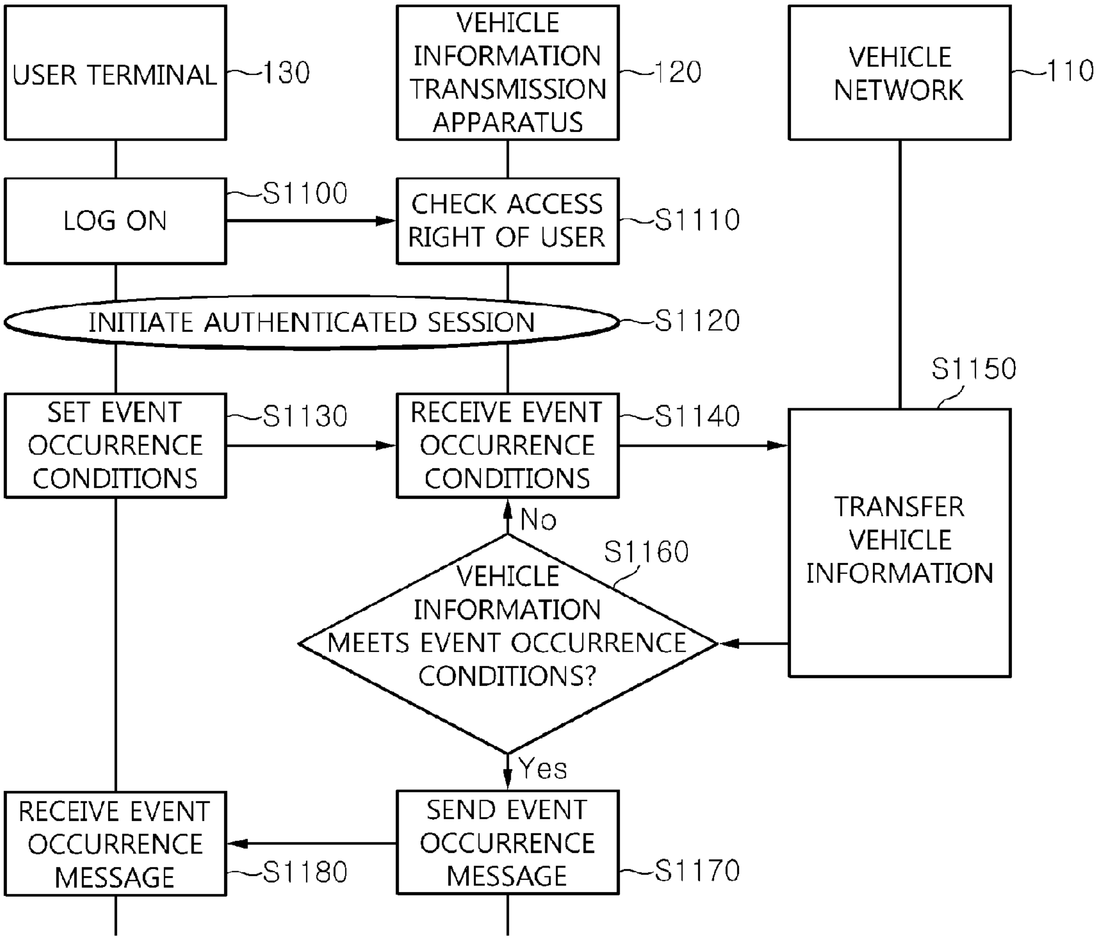

FIGS. 9 to 11 are flow diagrams showing a vehicle information transmission period control method performed by the vehicle information transmission apparatus 120 according to an embodiment of the present invention.

The vehicle information transmission period control method by the vehicle information transmission apparatus 120 shown in FIGS. 9 to 11 may be performed under the control of the control unit 121 of the vehicle information transmission apparatus 120 shown in FIG. 4.

FIG. 9 is a flow diagram showing a synchronous request (synchronous call) transmission method of the vehicle information transmission period control method performed by the vehicle information transmission apparatus 120 according to an embodiment of the present invention. In regard to the synchronous call transmission method, communication between the vehicle information transmission apparatus 120 and an external device is initiated when a user makes an information request and a control request via the user terminal 130. That is, the vehicle information transmission apparatus 120 processes data only when an information request and control message is received from the user terminal 130, and thereafter makes a response to the request message.

The synchronous call transmission method is configured to, if the control unit 121 of the vehicle information transmission apparatus 120 receives a vehicle information request from the user terminal 130, determine whether the grade of the requested vehicle information corresponds to the transmission grade of the user terminal 130, and transmit the vehicle information to the user terminal 130 if the grades correspond to each other.

The synchronous call transmission method performed by the vehicle information transmission apparatus 120 will be described in detail below with reference to FIG. 9. First, a user enters an ID, a password, and an authentication key using the user terminal 130 and logs on the vehicle information transmission apparatus 120 at step S900. Further, the vehicle information transmission apparatus 120 checks the access right of the user at step S910. That is, it is determined whether the grade of requested vehicle information corresponds to the transmission grade of the user terminal. If the user has the access right at step S910, an authenticated session is initiated at step S920.

Further, the user terminal 130 transmits a vehicle information request at step S930, and the vehicle information transmission apparatus 120 receives the vehicle information request and determines whether the vehicle information is searchable and conforms to the access right at step S940. If the vehicle information conforms to the access right, the vehicle information transmission apparatus 120 request the corresponding vehicle information from the vehicle network 110, and the vehicle network 110 that received the request transfers the vehicle information to the vehicle information transmission apparatus 120 at step S950. The vehicle information transmission apparatus 120 forwards the vehicle information to the user terminal 130 at step S960, so that the user terminal 130 receives the requested vehicle information at step S970.

FIG. 10 illustrates an asynchronous call transmission method for real-time information inquiry (that is, an asynchronous call with multiple real-time replies) of the vehicle information transmission period control method performed by the vehicle information transmission apparatus 120 according to an embodiment of the present invention. The asynchronous call transmission method with multiple real-time replies is a transmission method used to periodically check the state of specific vehicle information, and for this, the setting of variables isRealtime and refreshInterval is required. IsRealtime is a variable for indicating the periodically checked state of the corresponding vehicle information. In the case where IsRealtime is "Yes," the vehicle information may be inquired about at regular periods set in the variable refreshInterval, for example, at periods of 100 msec, and can be transmitted to the terminal.

The above-described asynchronous call transmission method with multiple real-time replies is configured such that when the user terminal 130 sets both vehicle information, which is to be periodically received, and the periods thereof, the control unit 121 of the vehicle information transmission apparatus 120 periodically transmits the set vehicle information to the user terminal 130 at the set periods.

The above-described asynchronous call transmission method with multiple real-time replies performed by the vehicle information transmission apparatus 120 will be described in detail below with reference to FIG. 10. First, a user enters an ID, a password, and an authentication key using the user terminal 130, and then logs on the vehicle information transmission apparatus 120 at step S1000. Further, the vehicle information transmission apparatus 120 checks the access right of the user at step S1010. That is, it is determined whether the grade of requested vehicle information corresponds to the transmission grade of the user terminal. If the user has the access right at step S1010, an authenticated session is initiated at step S1020.

Further, the user terminal 130 sets vehicle information, which is to be periodically received, and the periods thereof, at step S1030, and the vehicle information transmission apparatus 120 requests the set vehicle information at the set periods at step S1040. The vehicle network 110 that received the request transfers the vehicle information at the set periods at step S1050. The vehicle information transmission apparatus 120 forwards the vehicle information to the user terminal 130 at step S1060, so that the user terminal 130 receives the requested vehicle information at step S1070. Further, the user terminal 130 displays the received vehicle information to the user, and the user can determine the real-time variation in the corresponding vehicle information.

FIG. 11 illustrates an asynchronous request transmission method for event notification (that is, an asynchronous call with reply on event occurrence) of the vehicle information transmission period control method performed by the vehicle information transmission apparatus 120 according to an embodiment of the present invention. The asynchronous call transmission method with reply on event occurrence is configured such that the user previously generates several conditional expressions. For example, if it is assumed that conditional expressions for a vehicle speed of 30 km/h or more and for a door open event are previously set in the transmission apparatus, the transmission apparatus may inquire about pieces of information at periods of RefreshInterval, compare the pieces of information with the conditional expressions, and notify the terminal of a situation in which the event has occurred if the pieces of information satisfy the conditional expressions.

The above-described synchronous call transmission method with reply on event occurrence is configured such that when the user terminal 130 sets the event occurrence conditions, the control unit 121 of the vehicle information transmission apparatus 120 receives the vehicle information, determines whether the received vehicle information meets the set event occurrence conditions, and sends an event occurrence message indicating that the event has occurred to the user terminal if the vehicle information meets the event occurrence conditions.

The synchronous call transmission method with reply on event occurrence, which is performed by the vehicle information transmission apparatus 120, will be described in greater detail below with reference to FIG. 11. First, the user enters an ID, a password, and an authentication key using the user terminal 130, and then logs on the vehicle information transmission apparatus 120 at step S1100. Further, the vehicle information transmission apparatus 120 checks the access right of the user at step S1110. That is, it is determined whether the grade of requested vehicle information corresponds to the transmission grade of the user terminal. If the user has the access right at step S1110, an authenticated session is initiated at step S1120.

Further, the user terminal 130 sets event occurrence conditions at step S1130. The vehicle information transmission apparatus 120 receives the set event occurrence conditions at step S1140, and periodically requests vehicle information from the vehicle network 110. The vehicle network 110 transfers the requested vehicle information to the vehicle information transmission apparatus 120 at step S1150. The vehicle information transmission apparatus 120 determines whether the received vehicle information meets the event occurrence conditions at step S1160. If it is determined at step S1160 that the vehicle information received from the vehicle network 110 meets the event occurrence conditions, the vehicle information transmission apparatus 120 sends an event occurrence message indicating that the event has occurred to the user terminal 130 at step S1170. The user terminal 130 receives the event occurrence message at step S1180, and displays it to notify the user that the event has occurred.

The above-described embodiments of the present invention are not necessarily implemented as an apparatus and a method, and may also be implemented as a program for realizing functions corresponding to the components of the embodiments of the present invention or as a recording medium for storing the program.

In accordance with an aspect of the present invention, there is provided a vehicle information transmission apparatus, which can specify rights to access respective pieces of vehicle information, cope with a communication failure, and control transmission periods for respective pieces of vehicle information, in a vehicle information transmission apparatus which is intended to provide a diagnostic service, such as determination of whether an abnormality has occurred in driving devices such as an engine or a brake, and a security service for vehicle monitoring and theft tracking, via an external device of a vehicle.

Although the preferred embodiments of the present invention have been disclosed for illustrative purposes, those skilled in the art will appreciate that various modifications are possible, without departing from the scope and spirit of the invention as disclosed in the accompanying claims. It should be understood that these modifications are included in the scope of the claims of the present invention without departing from the scope and spirit of the invention.

What is claimed is:

1. A vehicle information transmission apparatus comprising:

a storage unit for storing pieces of collected vehicle information, transmission grades of the pieces of vehicle information, and grades of user terminals;

a control unit for performing control such that each piece of collected vehicle information is transmitted to a user terminal having a grade corresponding to a transmission grade of the collected vehicle information; and a transmission unit for transmitting the vehicle information to the user terminal in compliance with a control command output from the control unit, wherein the control unit is configured to so perform the control that, if communication with the user terminal having the grade corresponding to the transmission grade of the vehicle information has failed, the vehicle information is transmitted to another user terminal having a lower priority grade than the user terminal, and to periodically transmit, when the user terminal sets vehicle information that is to be periodically received and periods thereof, the set vehicle information to the user terminal at the set periods.

2. The vehicle information transmission apparatus of claim 1, wherein the control unit performs control such that a specific part of the collected vehicle information is transmitted to all user terminals.

3. The vehicle information transmission apparatus of claim 1, wherein the control unit performs control such that a notification of a failure in communication with the user terminal having the grade corresponding to the transmission grade of the vehicle information is provided to the another user terminal having the lower priority grade.

4. The vehicle information transmission apparatus of claim 1, wherein the control unit is configured to, when a vehicle information request is received from the user terminal, determine whether a grade of requested vehicle information corresponds to the transmission grade of the user terminal, and transmit the vehicle information to the user terminal if the grade of the requested vehicle information corresponds to the transmission grade.

5. The vehicle information transmission apparatus of claim 1, wherein the control unit is configured to, when the user terminal sets event occurrence conditions, receive the vehicle information, determine whether the received vehicle information meets the event occurrence conditions, and send an event occurrence message indicating that an event has occurred to the user terminal if the received vehicle information meets the event occurrence conditions.

6. A vehicle information transmission apparatus comprising:

a storage unit for storing pieces of collected vehicle information, transmission modes of the pieces of vehicle information, and passwords for the respective transmission modes, the transmission modes including any one of a driver mode, a passenger mode and a diagnostic tool mode;

a control unit for extracting a transmission mode corresponding to a password input from a user terminal, and performing control such that each piece of vehicle information is transmitted to a user terminal having the extracted transmission mode; and a transmission unit for transmitting the vehicle information to the user terminal in compliance with a control command output from the control unit.

7. The vehicle information transmission apparatus of claim 6, wherein in respective transmission modes, different algorithms are set to be used.

8. A vehicle information transmission apparatus comprising:

a storage unit for storing pieces of collected vehicle information, transmission modes of the pieces of collected vehicle information, and modes of user terminals, the transmission modes including any one of a driver mode, a passenger mode and a diagnostic tool mode, and having priorities;

a control unit for performing control such that each piece of collected vehicle information is transmitted to a user terminal having a mode corresponding to a transmission mode of the collected vehicle information; and a transmission unit for transmitting the vehicle information to the user terminal in compliance with a control command output from the control unit.

9. The vehicle information transmission apparatus of claim 8, wherein a user terminal that receives vehicle information in the driver mode receives vehicle information transmitted in the passenger mode.

* * * * *